United States Patent [19]

Stefanucci et al.

[11] 4,349,573
[45] Sep. 14, 1982

[54] LOW DENSITY COFFEE PROCESS

[75] Inventors: Arthur Stefanucci, Clifton; Michael G. Protomastro, Woodridge, both of N.J.

[73] Assignee: General Foods Corporation, White Plains, N.Y.

[21] Appl. No.: 210,971

[22] Filed: Nov. 28, 1980

[51] Int. Cl.³ .............................................. A23F 5/04
[52] U.S. Cl. .................................. 426/388; 426/595; 426/466
[58] Field of Search ................... 426/595, 466–469, 426/388

[56] References Cited

U.S. PATENT DOCUMENTS

| | | | |
|---|---|---|---|
| 3,122,439 | 2/1964 | MacAllister et al. | 426/467 |
| 3,700,462 | 10/1972 | Stefanucci et al. | 426/466 |
| 3,801,716 | 2/1974 | Mahlmann et al. | 426/466 |
| 4,169,164 | 9/1979 | Hubbard et al. | 426/467 |

OTHER PUBLICATIONS

Swetz et al., Coffee Processing Technology, vol. I, 1963, Avi: Westport, Conn., pp. 204, 237–239.

*Primary Examiner*—Joseph M. Golian
*Attorney, Agent, or Firm*—Thomas V. Sullivan

[57] ABSTRACT

A low density roast and ground coffee product which yields 20% more brewed coffee than and of equal quality to conventional roast and ground coffee product. Modifications to conventional roasting and grinding operations result in a faster roasting operation and a finer grind which together with a higher percentage of intermediate quality coffee and a darker roast high quality coffee results in the low density coffee product.

9 Claims, No Drawings

LOW DENSITY COFFEE PROCESS

BACKGROUND OF THE INVENTION

1. Field of the Invention

This invention relates to a process of preparing roast and ground coffee. More particularly, it relates to a process of preparing roast and ground coffee having improved flavor extractability. This invention especially relates to a process of preparing roast and ground coffee having a significantly lower free flow (bulk) density than conventionally prepared roast and ground coffee.

2. Description of the Prior Art

Green coffee beans have no desirable taste or aroma. Roasting of the green coffee beans develops both the taste and aroma of the beans. Following the roasting, the beans are ground to various particle size distributions to improve extraction efficiency.

Roast and ground coffee is a term which refers to a coffee product of conventionally prepared roast and ground coffee particles. Commercially available roast and ground coffee is usually formed by blending a variety of different grades or types of coffee to provide products with distinct flavor and aroma.

The standard technique in use today to prepare roasted and ground coffee is to pass green coffee beans into a commercial roaster wherein the coffee is roasted to a predetermied flavor measured and controlled by roast color; the roasted coffee on discharge from the roaster is generally quenched with water and then air cooled. The cooled beans are then tempered (allowed to stand to insure uniform distribution of moisture) and ground in roll type grinders, such as a Gump Mill, to obtain coffee particles with a desired size distribution. The roast color may be varied depending upon the types of green coffee used, the flavor characteristics to be developed and the intended use for the roasted coffee (e.g., as regular coffee or as percolator feed in a soluble coffee system). Similarly, the moisture content and particle size will be varied depending upon the intended use for the roasted coffee.

It has been found that the ordinary consumer can visually and organoleptically detect a difference of three or four color units. Color units refer to a system of color measurement which uses light reflectance as a measure of color. The color of coffee is determined by grinding roasted coffee and screening it using a U.S. Sieve No. 50 and pan. The portion that passes through a U.S. Sieve No. 50 and is retained on pan is collected, placed in a container of 1½ inch diameter and ½ inch deep and pressed under 1,200 psi on 1⅛ inch ram.

The pressed coffee is placed beneath a photoelectric search unit of the color measuring device and the difference is reflected light 595 m$\mu$ between a standard color plate and the coffee is indicated as color units on the scale of that instrument. When a lightly roasted coffee is placed beneath the search unit, the light reflectance is greater than the standard and the needle moves to a high reading.

The color measuring device employed is a photoelectric reflection unit, model 610, having a model G10-Y search unit, (Photovolt Company). The standard color plate used is a ceramic plate of brown color and hue. The standard brown plate exhibits the following reflection curve using magnesium oxide to represent 100% reflection.

| Wave Length, m$\mu$ | Percent Reflection |
|---|---|
| 580 | 14.0 |
| 600 | 17.0 |
| 620 | 21.4 |
| 650 | 26.0 |
| 700 | 24.3 |

It has also been known to separately process various fractions of a roasted and ground coffee product prior to combining the fractions. Roast and ground coffee products are usually formed by blending a variety of different coffee beans. There are generally considered to be three major types of coffee beans which are blended to form roast and ground coffee products. These are milds and Brazilians, which botanically are both characterized as Arabicas, and there is Robusta; which botanically is a Canephora. The Brazilian coffees are heavy body, moderately acid and aromatic in the cup while high grown Milds are winey-acid and very aromatic. Robustas have strong distinctive flavor characteristics; they are heavy body, neutral, slightly acid and slightly aromatic with varying degrees of a tarry flavor note.

Separate roasting of different coffee fractions prior to blending the fractions is a well-known technique in the coffee art for controlling the flavor of roasted and ground coffee.

The various grades of coffee are often classified as "low", "intermediate" or "high" with the geographical source of the coffee usually providing the distinguishing properties to the several grades.

Low grade coffees, such as Robustas, produce brews with strong distinctive natural flavor characteristics often described as bitter and possessing varying degrees of a rubbery or tarry flavor note. They are also characterized as heavy bodied, neutral, slightly acid and slightly aromatic. Besides the African Robustas, other low grade coffees include naturals such as Haiti XXX, Peru natural, current Salvadors, low grade Brazils, and low grade unwashed Arabicas such as Ugandas, Indonesians, Ivory Coast, Dominican Republics, Ecuador Resacas and Guatemalan TEM's.

Intermediate grade coffees include Brazilians and provide flavor and aroma characterized as bland, neutral and sweet. Examples of intermediate grade coffees are Brazilians, such as Santos, Sul de Minas, and Paranas and African naturals.

High grade coffees, often termed "milds" or "high grown" are characterized in terms of flavor and aroma as winey-acid, aromatic, fragrant and mild. Examples of typical high quality coffees are "milds" often referred to as high grade Arabicas, and include, among others, Colombians, Mexicans, and other washed milds, such as strictly hard bean Costa Ricans, Kenyas A and B's, and strictly hard bean Guatemalans.

Roast and ground coffees generally comprise a blend of all three classes of coffees. Blending is utilized to emphasize the desirable characteristics of each grade of coffees. For example, some strong body notes characteristic of low grade coffees are desirable as well as some fragrant and aromatic notes characteristic of high grown coffees. Intermediate grade quality coffees typically contribute to overall taste impact and body of the coffee. Because the most desirable flavor and aromas obtainable in roast and ground coffee blends come from high grown coffees, it is desirable to include high percentages of high grown coffees in roast and ground coffee blends. However, high grown coffees, as one might expect, are the most expensive of the three classes of coffees, and moreover, high grown flavor not complemented by other flavors is not desirable. Premium coffee blends contain high percentages of Colombian and Central American coffee.

Roast and ground coffee is provided in several "grinds" to maximize the extraction efficiency of the particular method employed to prepare brewed coffee. Thus, the familiar classification of "regular", "drip" and "fine" grinds are available. The standards of these grinds, as suggested in the 1948 Simplified Practice Recommendation by the U.S. Department of Commerce (see Coffee Brewing Workshop Manual, page 33, published by the Coffee Brewing Center of the Pan American Bureau), are as follows: "Regular grind", 33% is retained on a 14 mesh Tyler Standard Sieve, 55% is retained on a 28 mesh Tyler Standard Sieve and 12% passes through a 28 mesh Tyler Standard Sieve; "drip grind", 7% is retained on a 14 mesh Tyler Standard Screen, 73% on a 28 mesh Tyler Standard Sieve and 20% passes through a 28 mesh Tyler Standard Sieve; and "fine grind" 100% passes through a 14 mesh Tyler Standard Sieve, 70% being retained on a 28 mesh Tyler Standard Sieve and 30% passing through a 28 mesh Tyler Standard Sieve. Of the above-mentioned traditional grind sizes, the most preferred is "regular grind".

All percentage figures in this specification and the appended claims are in terms of weight unless stated otherwise.

While roast and ground coffee products do enjoy a substantial part of the coffee market, they have several disadvantages. One of the primary disadvantages is that conventional roast and ground coffee products have poor extractability. During preparation of cups of roast and ground coffee beverage, it has been shown that only about 20 percent of the solid material contained in the roast and ground coffee is extracted during conventional percolation processes. The remaining portion of the coffee is discarded as grounds. The poor extractability either results in a weakened beverage or in excessive brewing time. In order to compensate for low extractability, consumers usually increase the amount of coffee used to make a cup which increases expense to the consumer.

A number of techniques have been suggested to increase the extractability of roast and ground coffee blends.

U.S. Pat. Nos. 3,615,667 of Joffe; 3,660,106 of McSwiggin et al.; and 4,110,485 of Grubbs et al. disclose that the extractability of roast and ground coffee is improved by providing the coffee in the form of a flake. The flaked coffee is prepared by roll-milling roast and ground coffee to produce flakes of coffee having a bulk density of 0.38 to 0.5 grams/cc and a preferred thickness of 0.008 to 0.025 inches. As the coffee particles pass between two parallel rolls, they are crushed and flattened such that the coffee cellular structure is disrupted and the resulting appearance is that of a flake. Although conventionally prepared roast and ground coffee is composed of clearly defined cells providing a distinct structure made up of the individual cell walls, flaked coffee has an easily definable flake shape where the cell walls are crushed and there is nearly total cell disruption. This cellular disruption is said to provide 33% more cups of coffee of uniform beverage strength from a given weight of flaked coffee than from the same weight of non-flaked roast and ground coffee.

U.S. Pat. No. 3,769,031 of McSwiggin discloses a light-milled roast and ground coffee produced by roll-milling roast and ground coffee at pressures lower than those employed for producing flaked coffee. From the cell structure point of view, light-milled coffee has partial cell wall fracture, partial cell disruption and cells which have generally been flattened and compressed together to provide weakened and distorted but still definite cell structure. In general terms, light-milled coffee has weakened cell walls and partial cell disruption whereas flaked coffee has crushed cell walls and nearly total cell disruption. The cell distortion that occurs in light-milling results in from 20 to 65% of the cells being at least partially disrupted which explains the increased extractability of this product. Light-milled roast and ground coffee has the bulk appearance of conventional roast and ground coffee and, surprisingly, the same bulk density, and yet has from 10 percent to 30 percent increase in flavor strength over and above conventional roast and ground coffee.

U.S. Pat. No. 3,801,716 of Mahlmann et al. describes a process of first, compressing and then, granulating roast coffee beans. The compression operation disrupts virtually all the cells in the coffee beans and substantially degases the beans. Rupturing of the cells produces a product which is more readily extracted or which will yield a higher level of soluble solids as compared to similarly sized ground, but uncompressed, coffee. When the compressed coffee is comminuted to the particle size of conventional roasted and ground coffee, a coffee blend containing these particles will have a higher level of soluble solids and will produce a stronger brew than regular roasted and ground coffee.

U.S. Pat. No. 4,169,164 of Hubbard et al. discloses a two stage, fluidized bed, coffee roaster which produces a roasted coffee bean product having a substantially lower density than the product produced by conventional roasting processes. In the first stage, the beans are partially roasted at 440°–470° F. and the roasting is completed in the second stage at a temperature of 515°–545° F. The product of this two stage roasting has a density of 0.333 to 0.385 grams/cc while the product from a conventional roasting has a density of 0.400 to 0.446 grams/cc. Twenty-size ounces of the lower density coffee product is said to be equal to 32 ounces of the prior art product and to yield a coffee beverage of comparable strength to that of the higher density product. This roasting process produces a product which yields more coffee beverage per bean.

It is an object of this invention to provide a roast and ground coffee product with a flavor extraction efficiency superior to that of conventional roast and ground coffee.

It is another object of this invention to provide a low density coffee product utilizing conventional coffee roasting and grinding equipment.

It is a further object of this invention to provide an improved process for producing low (free flow) density coffee products.

It is yet another object of this invention to utilize conventional roasting and grinding equipment to produce a roast and ground coffee which will provide from 13 ounces of coffee as much coffee beverage as is provided by 16 ounces of conventional roast and ground coffee.

SUMMARY OF THE INVENTION

In accordance with the present invention it has been found that a combination of modifications to (a) the formulation of a roast and ground coffee, (b) the roasting conditions and degree of roasting (c) the fineness of the ground blend and (d) the manner of grinding which includes bypassing the normalizer to help achieve the lighter free flow density of ground product will produce a low density roast and ground coffee product, 13 ounces of which will provide brewed coffee having the same quantity and quality of brewed coffee that has been obtained heretofore from 16 ounces of a conventional roast and ground coffee. More particularly, this invention relates to a method of producing a low density roast and ground coffee product which comprises:

(a) preparing a roasted high quality coffee bean fraction under short roasting conditions effective to produce a roasted high quality coffee bean fraction having a roast color of no more than 50 and a roasted whole bean bulk density less than 0.35 g/cc.;

(b) preparing a roasted intermediate quality coffee bean fraction under short roasting conditions effective to produce a roasted intermediate quality coffee bean fraction having a roasted whole bean bulk density less than 0.32 g/cc.;

(c) preparing a roasted low quality coffee bean fraction under short roasting conditions effective to produce a roasted low quality coffee bean fraction having a roasted whole bean bulk density less than 0.40 g/cc.

(d) blending the roasted fractions of steps (a), (b) and (c) in a ratio effective to produce a ground blend having a maximum free flow density of 0.30 g/cc.; and, (e) grinding the roasted blend of step (d) to an average particle size of 880–900$\mu$ for electric percolator grind or 830–850$\mu$ for stove percolator grind or 740–760$\mu$ for automatic drip grind.

DESCRIPTION OF THE PREFERRED EMBODIMENTS

The present invention relates to a method of preparing a low density roast and ground coffee product which has an improved flavor extractability over a conventional roast and ground coffee product. This improved product does not require the use of any new or different processing equipment. Rather, it is prepared using roasting and grinding equipment currently in use in the art but operated with certain hereindescribed modifications. Further, the types of beans employed heretofore may be used to prepare the low density coffee of this invention although the ratio of the several types may be varied to achieve the desired results.

Conventional roast and ground coffees are generally prepared by blending a variety of the three major types of coffee. The low density product of this invention is also prepared by blending together the three types of coffee. Although any one of each of the three grades of coffee may be combined to prepare the products of this invention, it is preferred to employ a Columbian high grade, a Brazilian intermediate grade and a Robusta low grade. Those skilled in the art can appreciate that several coffees of any of the three grades may be employed in combination when practicing this invention and these combinations of a given grade of coffee are included in the useful green coffees which may be employed as a starting material in the present process.

The procedure known as "blending after roasting" or the BAR method is employed here. In this BAR method each of the green coffees is roasted in the most efficient manner to achieve the desired results for which this particular coffee was chosen. Thus, each of the several coffees may be roasted to a color selected to enhance its contribution to the final blend. Following the roasting the several grades of roasted coffee are blended together and then sent to the grinder.

The low density roast and ground coffee of this invention is produced by a number of factors not utilized in this combination heretofore. The desired result is achieved by modifying the roasting and grinding operations as well as by adjusting the ratio of the several coffees in the final blend.

The roasting process employed in practicing this invention may be described as "fast" or "short" roasting. The roasting conditions are chosen to provide a roasted product which has a lower bulk density than a similar product prepared heretofore in a conventionally operated roasting process. It is desired to prepare a roasted product with a bulk density about 5–10% lower than that achieved by conventional roasting. Preferably the bulk densities of the high and low grade coffees are 5–6% lower and that of the intermediate grade coffee is 7–8% lower. Bulk densities achieved under standard roasting conditions are about 0.34 to 0.38 g/cc. for Colombians, about 0.32 to 0.35 g/cc. for Brazilians and about 0.40 to 0.42 g/cc. for Robustas. Generally, short roasting should produce a high quality coffee with a bulk density of less than 0.35 g/cc., an intermediate quality coffee with a bulk density of less than 0.32 g/cc. and a low quality coffee with a bulk density of less than 0.40 g/cc.

A number of roasting operating conditions may be varied to produce the lower density roasted coffee by this short roasting process. It has been found that in the short roasting of this invention a proper combination of a smaller charge of green beans, shorter flame time, higher modulation temperature, more combustion and recirculating air, a lower quench rate, a longer quench time, a shorter total cycle time and higher set end temperatures will produce the lower bulk density desired. As to roast color, the high grade coffee should be roasted to a darker color, viz., from 55 (conventional) to no more than 50 and preferably 45, while the intermediate and low grades should be roasted to the same color of a conventional product. In view of the large number of variables available to control the roasting process, the precise value or even range of values for the operating conditions for short roasting cannot be described with any degree of completeness. However, one skilled in the art can, after reviewing this specification and illustrative example, by merely performing several experimental runs, obtain sufficient date to permit the preparation of a lower density roasted coffee for a given variety of green coffee.

After each of the green coffees chosen for the preparation of a low density roast and ground blended coffee has been short roasted to the desired color and bulk density, the roasted fractions are blended together and then ground. The low density blends of this invention contain a higher percentage of intermediate quality roasted coffee (Brazilian) than the 30–40% which usually comprises the conventional roast and ground product. As a general rule the amount of intermediate quality coffee in these low density blends should be at least 50%, with 50–60% being the usual range. There are some differences in formulations which should be employed to provide the three grinds in which the final product is usually made available. Generally, the regular percolator grind contains more intermediate quality coffee than the electric percolator grind which in turn contains more intermediate quality coffee than the automatic drip grind. The high quality coffee generally constitutes 25-40% of the final blend with the automatic drip grind containing more of this quality coffee than the electric percolator grind which in turn contains more high quality coffee than the regular percolator grind. Low quality coffee generally comprises 10-15% of the final blend with the two percolator grinds containing about the same and the automatic drip grind containing somewhat less. Adjustments within these general descriptions can be made by those skilled in the art depending on the quality desired and the particular coffees employed. The general guideline here is to blend the roasted coffees so as to produce a roast and ground product with a maximum free flow density of 0.3 g/cc.

After the three grades of roasted beans are blended together, they are ground in any of the commercially available grinders. It has been found that the low density blend should be ground to a somewhat finer grind than the conventional roast and ground product. The following table lists the average particle sizes for the three grinds of a conventional roast and ground coffee product and a comparable low density roast and ground coffee prepared in accordance with the present invention.

| Grind | Average Particle Size, μ | |
|---|---|---|
| | Conventional | Low Density |
| Electric percolator | 1060 | 890 |
| Regular percolator | 920 | 840 |
| Automatic drip | 870 | 750 |

The skilled artisan can make comparable adjustments when preparing a low density version of a particular conventional coffee product. Generally, the average particle size of the finer grinds of this invention should be 880-900μ for electric percolator grind, 830-850μ for stove percolator grind and 740-760μ for automatic drip grind.

In addition to operating the grinder so as to produce a finer grind, it has been found that bypassing the grinder normalizer is beneficial in producing a low density product. The grinder normalizer is located at the outlet of the grinder and contains a series of paddles attached to a rotating shaft. Its purpose is to break up chaff and to achieve a heavier density particle. By bypassing the grinder normalizer, the particle size of the ground coffee remains unchanged and is thus somewhat lighter than a comparable ground product which has passed through the normalizer.

By operating the roaster and grinder as described above and by blending the roasted bean in the described ratios, a low density roast and ground coffee product is produced which has superior flavor extractability. Extraction evaluations show that a low density roast and ground coffee prepared in accordance with the present invention will yield 90 cups of brewed coffee per pound which have a quality and flavor strength equal to that of 75 cups of brewed coffee prepared from a pound of conventional roast and ground coffee. Stated in another way, 13 ounces of the low density roast and ground coffee of this invention is equal to 16 ounces of a conventional roast and ground coffee.

The following example illustrates the practice of this invention.

EXAMPLE

A conventional roast and ground coffee was prepared in three conventional grinds and subjected to taste and flavor assessment with roast and ground coffee prepared in accordance with the present invention under modified roasting and grinding procedures so as to produce a lower density coffee product.

The roast and ground blends were prepared from separately roasted batches of a high grade Colombian, an intermediate grade Brazilian and a low grade Robusta. All of the coffees were separately roasted in a Thermalo roaster.

Twelve hundred pound batches of each of the three grades of coffee were roasted under conventional roasting conditions including a flame time of 10-12 minutes, modulation temperatures of 700°-1040° F. and 650°-980° F., a quench rate of 10.5 gpm and a total cycle time of 15.5-17.5 minutes. The roast color of the Colombian was 55, of the Brazilian, 60 and of the Robusta, 85. The complete set of standard roasting conditions is set forth in Table I below.

The three grades of coffee were then each separately roasted under the fast roasting conditions of the present invention in 1000 pound batches. These conditions included a shorter flame time of 5.0-7.5 minutes, higher modulation temperatures of 1200° F. and 700°-980° F., a lower quench rate of 7.0 gpm and a shorter total cycle time of 9.0-11.5. The roast color of the Brazilian and Robusta was 60 and 85, respectively, the same as the standard roasted product, but the Colombian was roasted to a darker color of 45. These and the rest of the fast roasting conditions are also set forth in Table I.

TABLE I

| ROASTING CONDITIONS | | |
|---|---|---|
| | Standard Roasting | Fast Roasting |
| Charge Wt. (lbs.) | 1200 | 1000 |
| Flame Time (min.) | 10-12 | 5.0-7.5 |
| Modulation Temp., °F. | | |
| I | 700-1040 | 1200 |
| II | 650-980 | 700-980 |
| Combustion Air (CFM) | 480 | 550-600 |
| Recirculating Air (CFM) | 3650-3850 | 4500-4700 |
| Quench (gals.) | 18.0-19.0 | 15.5-16.0 |
| Quench Rate (gal./min.) | 10.5 | 7.0 |
| Quench Time (min.) | 1.75 | 2.25 |
| Total Cycle Time (min.) | 15.5-17.5 | 9.0-11.5 |
| Set End Temps., °F., and Color | | |
| Colombian | 411-428; 55 | 425-440; 45 |
| Brazilian | 409-419; 60 | 410-426; 60 |
| Robustas | 412-432; 85 | 415-435; 85 |

The bulk density of each of the batches of roasted coffee is shown in Table II below. The lower density achieved by the fast roasting is manifest.

TABLE II

| | Bulk Density of Roasted Coffee, g/cc. | |
|---|---|---|
| | Standard Roasting | Fast Roasting |
| Colombian | 0.360 | 0.340 |
| Brazilian | 0.339 | 0.314 |
| Robusta | 0.412 | 0.390 |

Blends of the roasted beans were prepared and then were ground to form roast and ground blends in three grinds, i.e., for electric percolation, regular or stove percolation and automatic drip. The fast roasted coffee was blended to produce a lower density product and was ground to a finer grind than the conventional product. The grinder normalizer was bypassed when the fast roasted coffee was being ground. The formulations employed, the particle size of the three grinds and the free flow density of the several products are presented in Table III below.

TABLE III

|  | Standard | Low Density |
|---|---|---|
| Electric Percolation |  |  |
| Formulation, % |  |  |
| Colombian | 40 | 30 |
| Brazilian | 30 | 55 |
| Robusta | 30 | 15 |
| Average particle size, $\mu$ | 1060 | 890 |
| Density, g/cc. | 0.370 | 0.285 |
| Regular Percolation |  |  |
| Formulation, % |  |  |
| Colombian | 30 | 25 |
| Brazilian | 40 | 60 |
| Robusta | 30 | 15 |
| Average particle size, $\mu$ | 920 | 840 |
| Density, g/cc. | 0.371 | 0.285 |
| Automatic Drip |  |  |
| Formulation, % |  |  |
| Colombian | 35 | 40 |
| Brazilian | 40 | 50 |
| Robusta | 25 | 10 |
| Average particle size, $\mu$ | 870 | 750 |
| Density, g/cc. | 0.370 | 0.285 |

Coffee beverage was prepared from each of the above roast and ground products and subjected to taste evaluation by a panel of trained coffee tasters. Each of the standard products was brewed at a recipe level of 75 cups/lb. while each of the low density products was prepared at a 90 cups/lb. level. The taste panel's evaluation of each of the low density products was that its flavor quality and flavor strength were equal to that of the comparable standard product. Thus, 13 ounces of the low density roast and ground coffee prepared in accordance with the present invention will make as many cups of coffee as 16 ounces of conventional roast and ground coffee and will have comparable flavor quality and flavor strength.

We claim:

1. A method of producing a low density roast and ground coffee product such that 13 ounces of the coffee product will produce a brew which is equal in flavor quality and flavor strength to a brew prepared from 16 ounces of conventional roast and ground coffee which comprises:
   (a) preparing a roasted high quality coffee bean fraction under short roasting conditions effective to produce a roasted high quality coffee bean fraction having a roast color of no more than 50 and a bulk density less than 0.35 g/cc.;
   (b) preparing a roasted intermediate quality coffee bean fraction under short roasting conditions effective to produce a roasted intermediate quality coffee bean fraction having a roast color of 60 and a bulk density less than 0.32 g/cc.;
   (c) preparing a roasted low quality coffee bean fraction under short roasting conditions effective to produce a roasted low quality coffee bean fraction having a roast color of 85 and a bulk density less than 0.40 g/cc.;
   (d) blending the roasted fractions of steps (a), (b) and (c) in a ratio effective to produce a ground blend having a maximum free flow density of 0.30 g/cc. and wherein the high quality coffee constitutes 25–40%, the intermediate quality coffee constitutes 50–60% and the low quality coffee constitutes 10–15% of the final blend;
   (e) grinding the roasted blend of step (d), while bypassing the grinder normalizer, to an average particle size of 880–900$\mu$ for electric percolator grind; of 830–850$\mu$ for stove percolator grind; or of 740–760$\mu$ for automatic drip grind.

2. A method according to claim 1 wherein the high quality coffee bean fraction is Colombian.

3. A method according to claim 1 wherein the intermediate quality coffee bean fraction is Brazilian.

4. A method according to claim 1 wherein the low quality coffee bean fraction is Robusta.

5. A method according to claim 1 wherein the ratio of the roasted fractions in the electric percolator grind is 30/55/15.

6. A method according to claim 1 wherein the ratio of the roasted fractions in the stove percolator grind is 25/60/15.

7. A method according to claim 1 wherein the ratio of the roasted fractions in the automatic drip grind is 40/50/10.

8. A method according to claims 5, 6 or 7 wherein the free flow density of the ground blend is 0.285 g/cc.

9. A method according to claim 1 wherein the roasted high quality coffee bean fraction has a color of 45.

* * * * *